United States Patent
Bauer et al.

(10) Patent No.: US 7,468,084 B2
(45) Date of Patent: Dec. 23, 2008

(54) DEVICE FOR CONDITIONING RECIRCULATING AIR, ESPECIALLY CLEAN ROOM AIR

(75) Inventors: Helmut Bauer, Ludwigsburg (DE); Manfred Renz, Ditzingen (DE)

(73) Assignee: M+W Zander Facility Engineering GmbH, Stuttgart (DE)

( * ) Notice: Subject to any disclaimer, the term of this patent is extended or adjusted under 35 U.S.C. 154(b) by 297 days.

(21) Appl. No.: 10/905,033

(22) Filed: Dec. 11, 2004

(65) Prior Publication Data

US 2005/0132677 A1   Jun. 23, 2005

(30) Foreign Application Priority Data

Dec. 18, 2003  (DE) .................................. 103 61 335
Mar. 26, 2004  (DE) ........................ 10 2004 016 402

(51) Int. Cl.
  *B01D 50/00*  (2006.01)
(52) U.S. Cl. ........................ 55/385.2; 55/471; 55/472; 55/473; 96/132; 96/138; 96/142; 454/187
(58) Field of Classification Search ................. 55/385.2, 55/471–473, 585.2; 96/132, 138, 142; 454/187
See application file for complete search history.

(56) References Cited

U.S. PATENT DOCUMENTS

| | | | | |
|---|---|---|---|---|
| 3,143,952 A * | 8/1964 | Simons | ........................ | 454/190 |
| 4,191,543 A * | 3/1980 | Peters | .......................... | 96/223 |
| 4,371,386 A * | 2/1983 | DeVecchi | ..................... | 55/338 |
| 4,531,454 A * | 7/1985 | Spoormaker | ................. | 454/232 |
| 4,549,472 A * | 10/1985 | Endo et al. | .................... | 454/187 |
| 4,693,175 A * | 9/1987 | Hashimoto | ................... | 454/187 |
| 4,838,150 A * | 6/1989 | Suzuki et al. | ................ | 454/187 |
| 4,955,997 A * | 9/1990 | Robertson, III | .............. | 96/138 |
| 5,096,477 A * | 3/1992 | Shinoda et al. | ............. | 55/385.2 |
| 5,626,820 A * | 5/1997 | Kinkead et al. | ............. | 422/122 |
| 5,828,572 A * | 10/1998 | Hasegawa et al. | ........... | 700/117 |
| 5,858,041 A * | 1/1999 | Luetkemeyer | .............. | 55/385.2 |
| 5,958,114 A * | 9/1999 | Sunahara et al. | .............. | 96/417 |
| 6,033,301 A * | 3/2000 | Suwa | .......................... | 454/187 |
| 6,174,341 B1 * | 1/2001 | Burge | ......................... | 55/385.2 |
| 6,321,637 B1 * | 11/2001 | Shanks et al. | .................. | 95/273 |
| 6,328,776 B1 * | 12/2001 | Shanks et al. | ............... | 55/385.2 |
| 6,572,468 B1 * | 6/2003 | Sasaki et al. | ................. | 454/187 |
| 6,755,734 B2 * | 6/2004 | Yokoyama et al. | ........... | 454/187 |
| 6,835,128 B1 * | 12/2004 | Olson | ......................... | 454/232 |
| 6,869,457 B2 * | 3/2005 | Nakagawa | ................... | 55/385.2 |
| 2005/0160706 A1 * | 7/2005 | Kim et al. | ................... | 55/385.2 |
| 2006/0174596 A1 * | 8/2006 | Choi et al. | ..................... | 55/467 |
| 2006/0217056 A1 * | 9/2006 | Gomi et al. | .................. | 454/187 |

* cited by examiner

*Primary Examiner*—Jason M Greene
*Assistant Examiner*—Minh-Chau T Pham
(74) *Attorney, Agent, or Firm*—Gudrun E. Huckett

(57) ABSTRACT

A device for conditioning recirculating air in a cleanroom has at least one fan having a housing. A return air conduit is provided through which a first portion of recirculating air is supplied from the cleanroom to the at least one fan. A second portion of the recirculating air is directly supplied to the at least one fan by bypassing the at least one return air conduit.

44 Claims, 12 Drawing Sheets

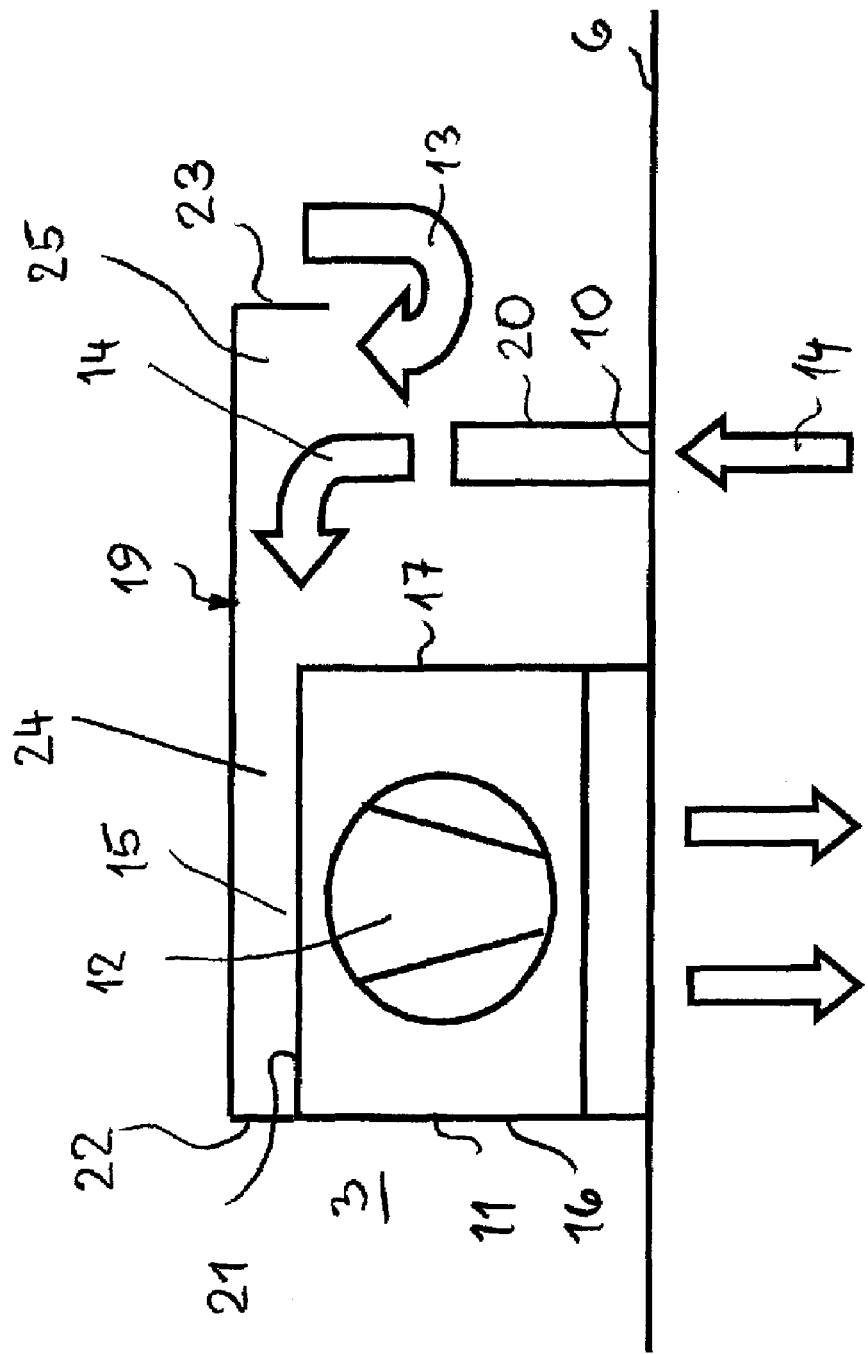

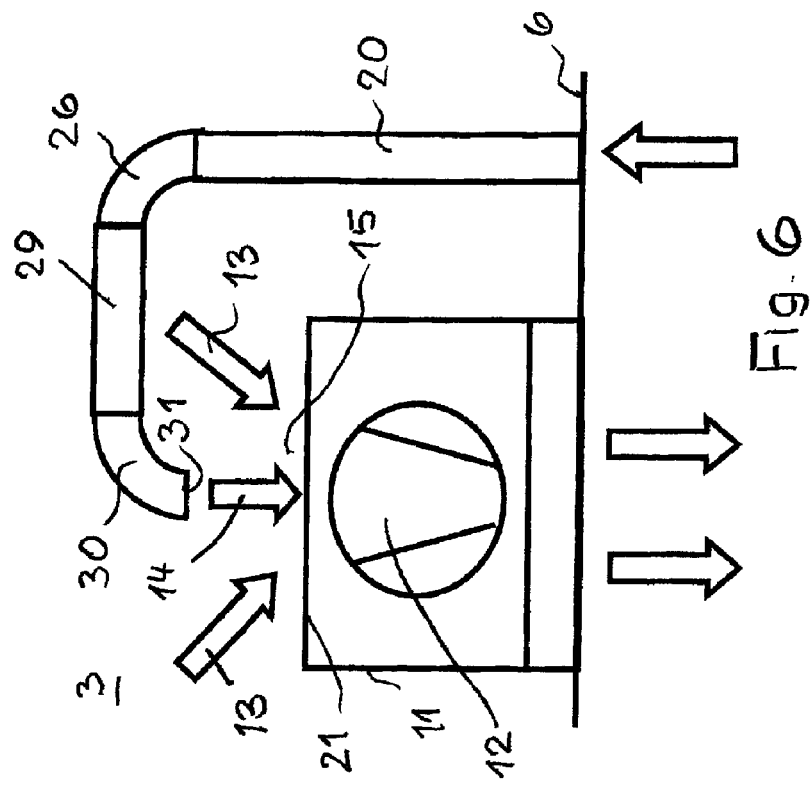
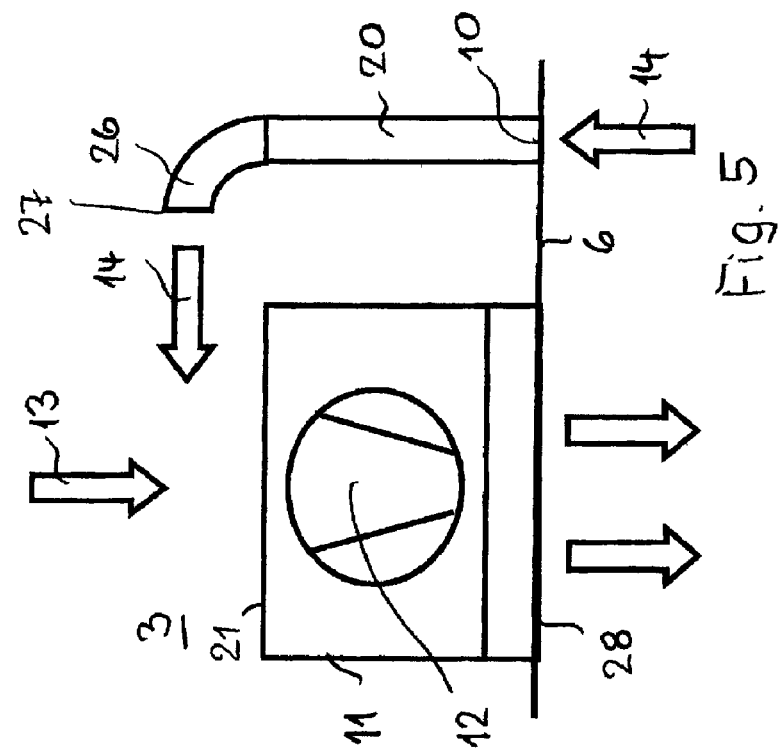

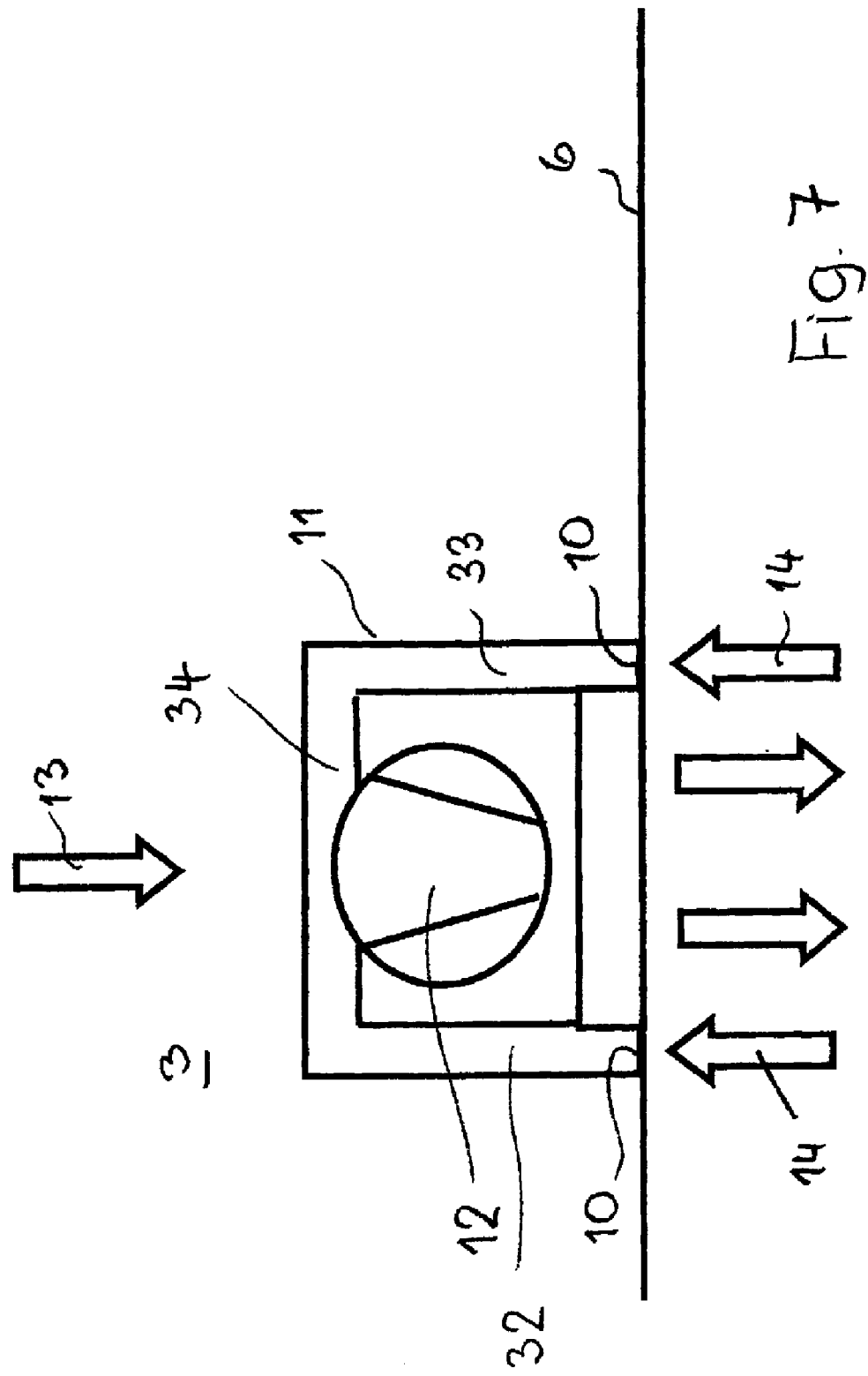

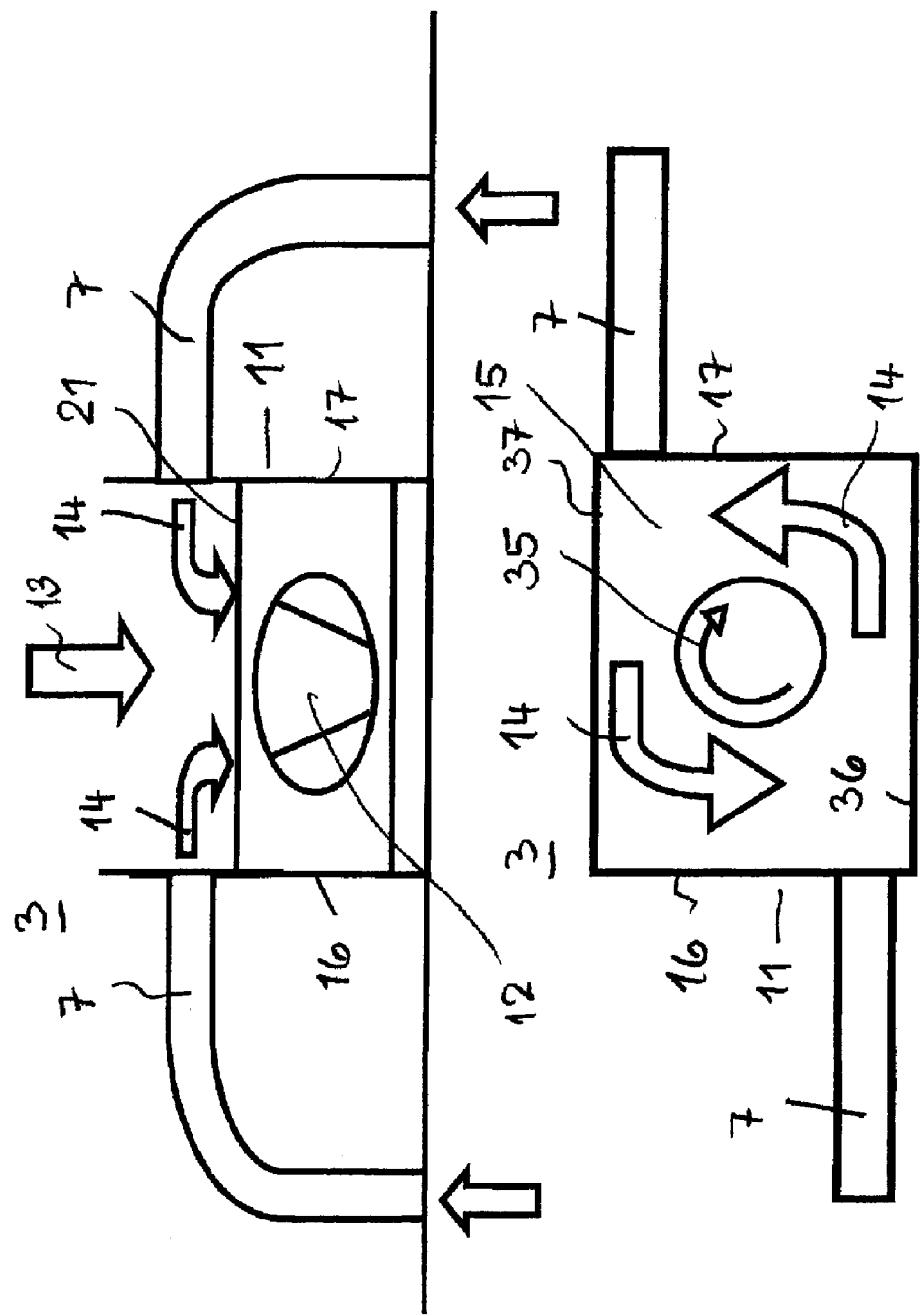

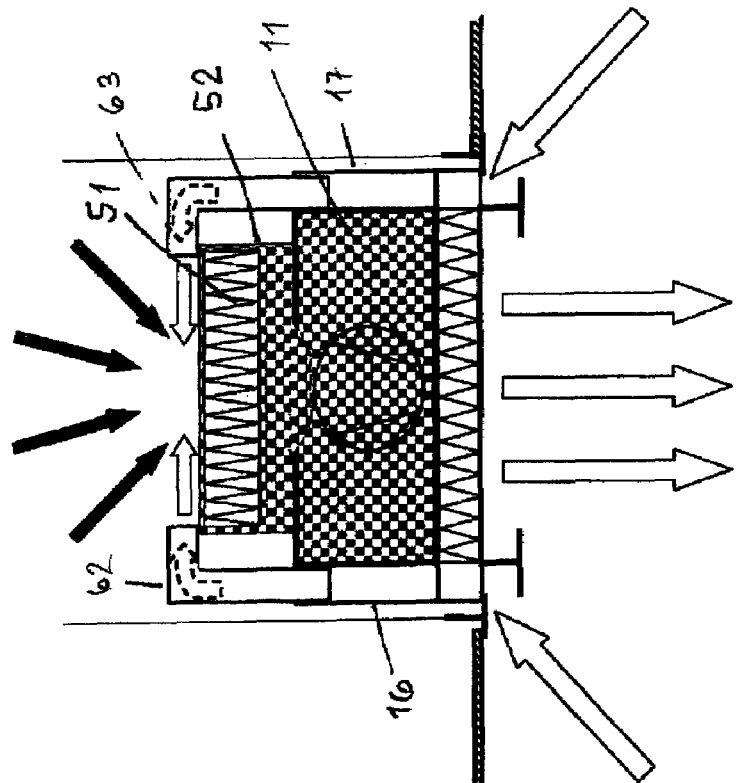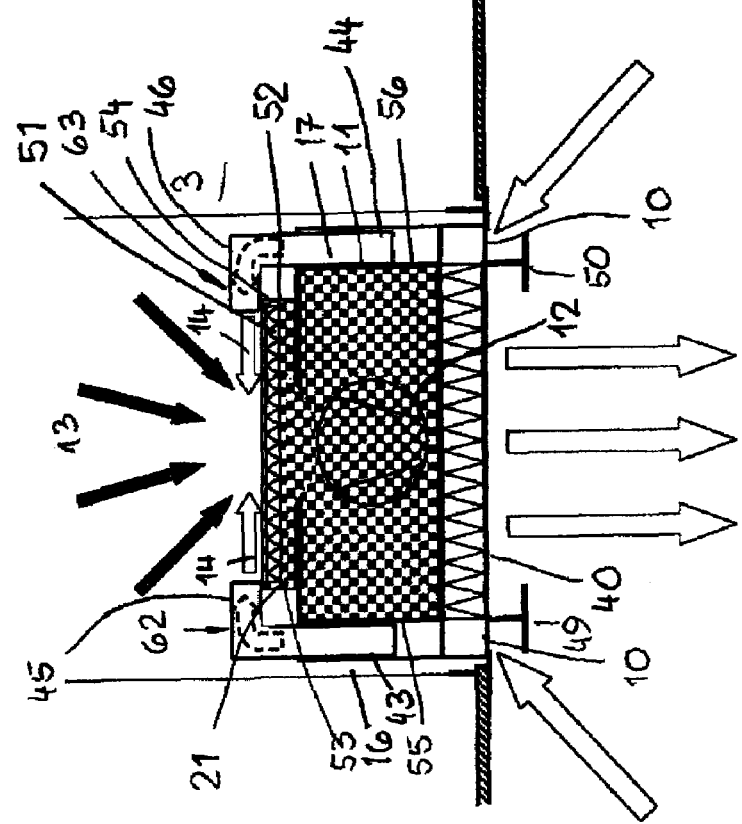

DEVICE FOR CONDITIONING RECIRCULATING AIR, ESPECIALLY CLEAN ROOM AIR

BACKGROUND OF THE INVENTION

The invention relates to a device for conditioning recirculating air, preferably cleanroom air. The device comprises at least one fan arranged in a housing to which fan recirculating air is fed from a removal area, preferably a cleanroom, through at least one return air channel or conduit.

In cleanroom technology it is known to arrange cooling devices for cooling the recirculating air on the ceiling of a cleanroom. It is necessary to provide conduits for the cooling devices on the cleanroom ceiling, and this constitutes a significant constructive expenditure. The ceiling layout can be changed only with great expenditure because of the conduits. Moreover, the cooling devices entail the risk of leakage. The cooling device can drip so that the equipment in the cleanroom can become damaged.

SUMMARY OF THE INVENTION

It is an object of the present invention to configure the device of the aforementioned kind such that, while having a constructively simple configuration, an optimal operation is possible.

In accordance with the present invention, this is achieved in that a portion of the recirculating air is directly supplied from the removal area to the fan by bypassing the return air channel.

In the device according to the invention, a portion of the recirculating air is supplied to the fan by passing through the return air channel. The other portion of the recirculating air is supplied directly to the fan by bypassing the return air channel. By dividing the recirculating air in this way, it is possible to cool only that portion of the recirculating air that flows through the return air channel while the recirculating air that is directly supplied to the fan remains uncooled. In the area of the return air channel or conduit, the recirculating air cooling device can be arranged such that even in the case of leakage the cooling device cannot drip into the removal area or space from which the recirculating air is removed. Since a cooling action is not required for the recirculating air that is supplied directly to the fan, no recirculating air cooling devices are needed for this portion so that the device according to the invention can be produced with minimal constructive expenditure in an inexpensive way. When the device is used in cleanrooms, the fans can be arranged in the ceiling area of such a cleanroom, for example, according to the grid dimensions. Since the same quantity of the recirculating air portion is supplied to each fan, the supply air of each fan has the same temperature. A subsequent change of the ceiling layout is possible without problems because recirculating air cooling devices and corresponding conduits are not present.

BRIEF DESCRIPTION OF THE DRAWING

FIG. 4 shows schematically a third embodiment of a filter-fan-unit of the device according to the invention for conditioning recirculating air.

FIG. 5 shows schematically a fourth embodiment of a filter-fan-unit of the device according to the invention for conditioning recirculating air.

FIG. 6 shows schematically a fifth embodiment of a filter-fan-unit of the device according to the invention for conditioning recirculating air.

FIG. 7 shows schematically a sixth embodiment of a filter-fan-unit of the device according to the invention for conditioning recirculating air.

FIG. 8 shows in an illustration corresponding to the illustrations of FIGS. 2 through 7 yet another embodiment of a filter-fan-unit.

FIG. 9 shows a plan view of the filter-fan-unit according to FIG. 8.

FIG. 15 shows yet another filter fan-unit in an illustration corresponding to that of FIGS. 2 to 8.

FIG. 16 shows yet another filter fan-unit according to the present invention in an illustration corresponding to that of FIGS. 2 to 8.

DESCRIPTION OF THE PREFERRED EMBODIMENTS

Figure 1:
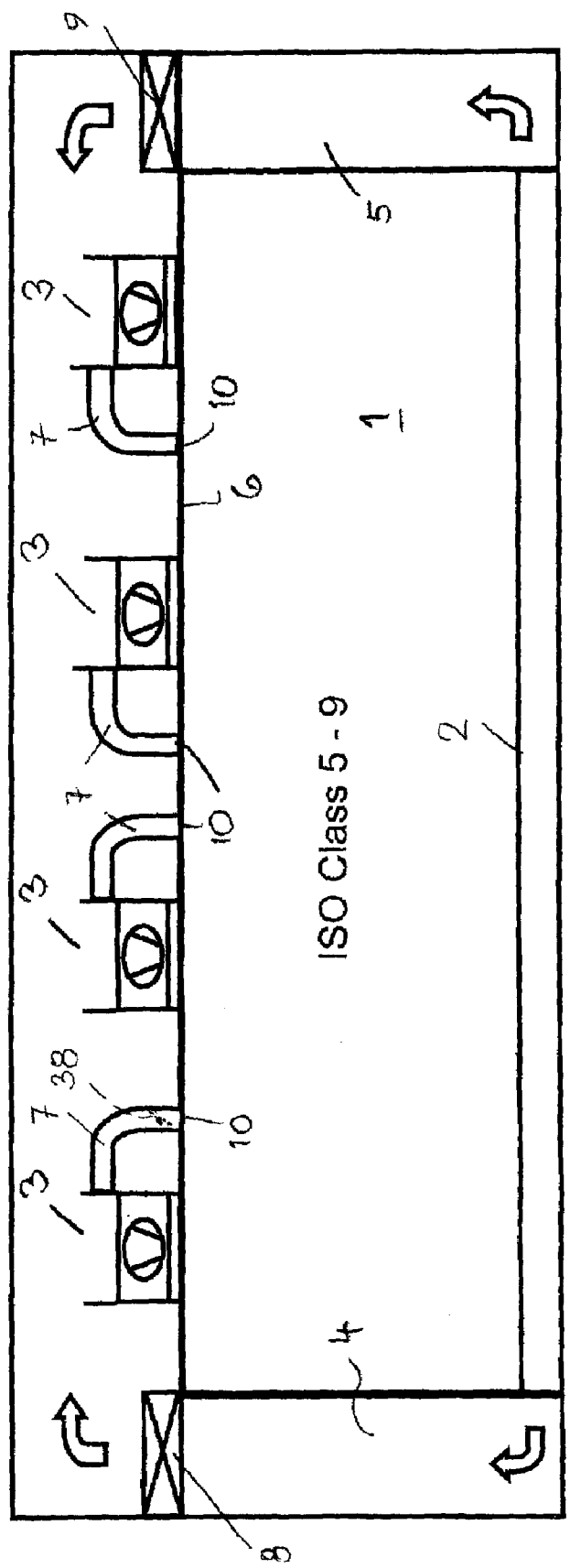
FIG. 1 shows schematically the device according to the invention for conditioning recirculating air.

The device is provided for conditioning recirculating air, preferably in clean rooms. FIG. 1 shows an example of a cleanroom 1 having a double bottom 2. In the ceiling area of the cleanroom 1, the filter-fan-units 3 are arranged through which the clean air is guided downwardly into the cleanroom 1. On opposed sides of the cleanroom 1, return air conduits 4, 5 are provided that extend from the bottom 2 to the ceiling 6 of the cleanroom. The filter-fan-units 3 suck in the recirculating air from the double bottom area through return air channels or conduits 4, 5 as is known in the art. Each filter-fan-unit 3 has correlated therewith an intake line 7 that opens into the ceiling 6 of the cleanroom 1 and through which a portion of the recirculating air is supplied directly to the correlated filter-fan-unit 3, respectively.

In the illustrated example, the return air conduits 4, 5 and the intake lines 7 are designed such that 50 percent of the return air are supplied to the filter-fan-units 3, respectively. Since not the entire quantity of recirculating air is guided through the double bottom 2 and the return air conduits 4, 5, the inner width of the double bottom 2 as well as the cross-sectional area of the return air conduits 4, 5 can be selected to be small. Accordingly, the recirculating air cooling devices 8, 9 provided at the end of the return air conduits 4, 5 in the flow direction can also have smaller intake areas than those in conventional cleanrooms. The openings 10 provided in the ceiling 6 guide a portion of the recirculating air directly to the filter-fan-units 3. The air resistance of the openings 10 in the ceiling 6 is matched to the return air resistance in the return air conduits 4, 5 by the cooling devices 8, 9. The recirculating air resistance is determined by the return action of the recirculating air through the double bottom 2 and the return air conduits 4, 5 and can be kept small. The portion of the return air that is sucked in through the openings 10 is not cooled. However, the portion of the recirculating air that is taken in through the return air conduits 4, 5 must be cooled to a greater extent than in the case of a clean room where the entire recirculating air is returned through the return air conduits. The cooled return air is mixed optimally directly above the intake area of the filter-fan-units 3 with the return air that is returned through the intake lines 7 and not cooled.

Figure 10:
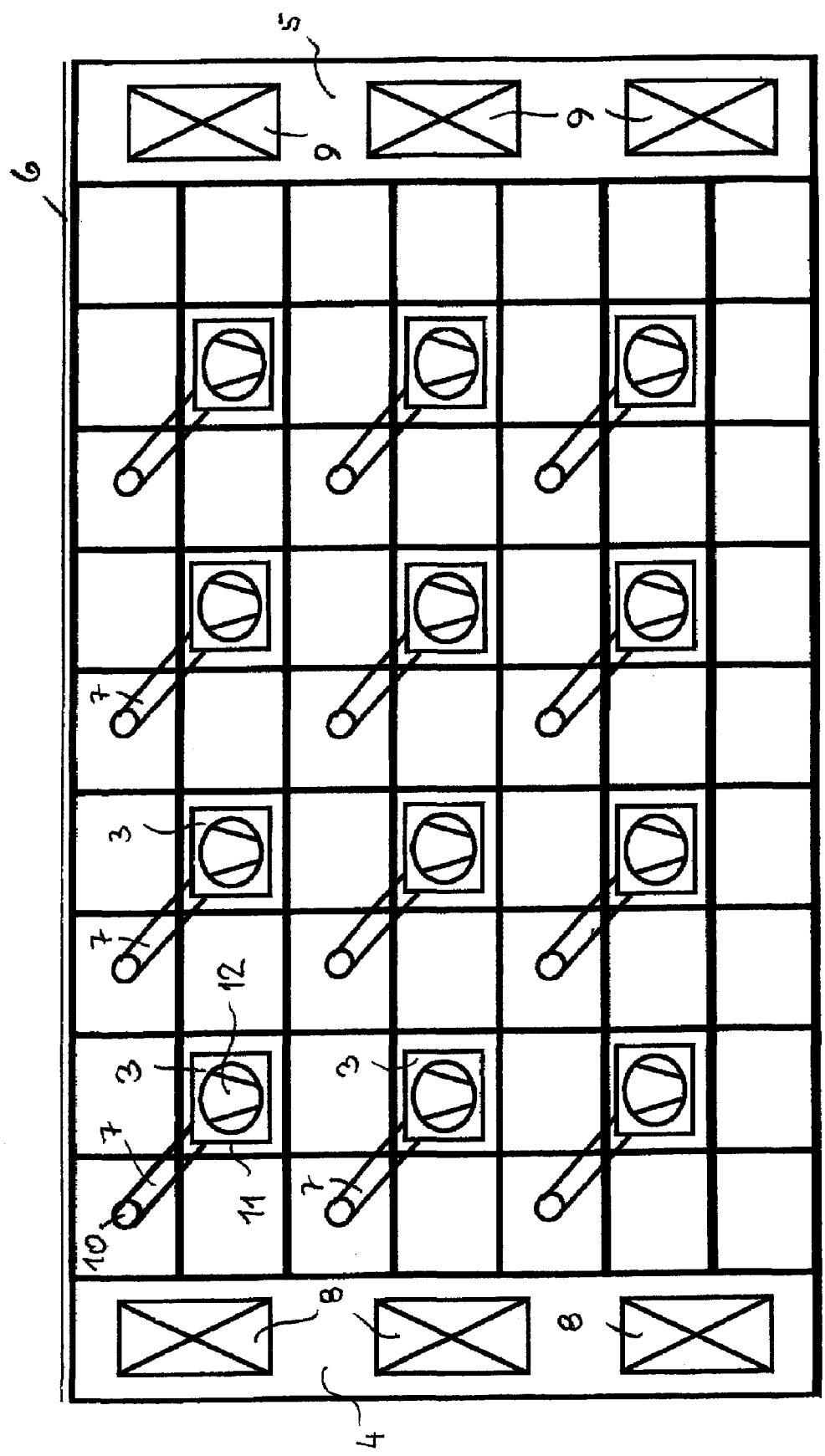
FIG. 10 shows in a plan view a first ceiling layout of a device according to the present invention.
Figure 11:
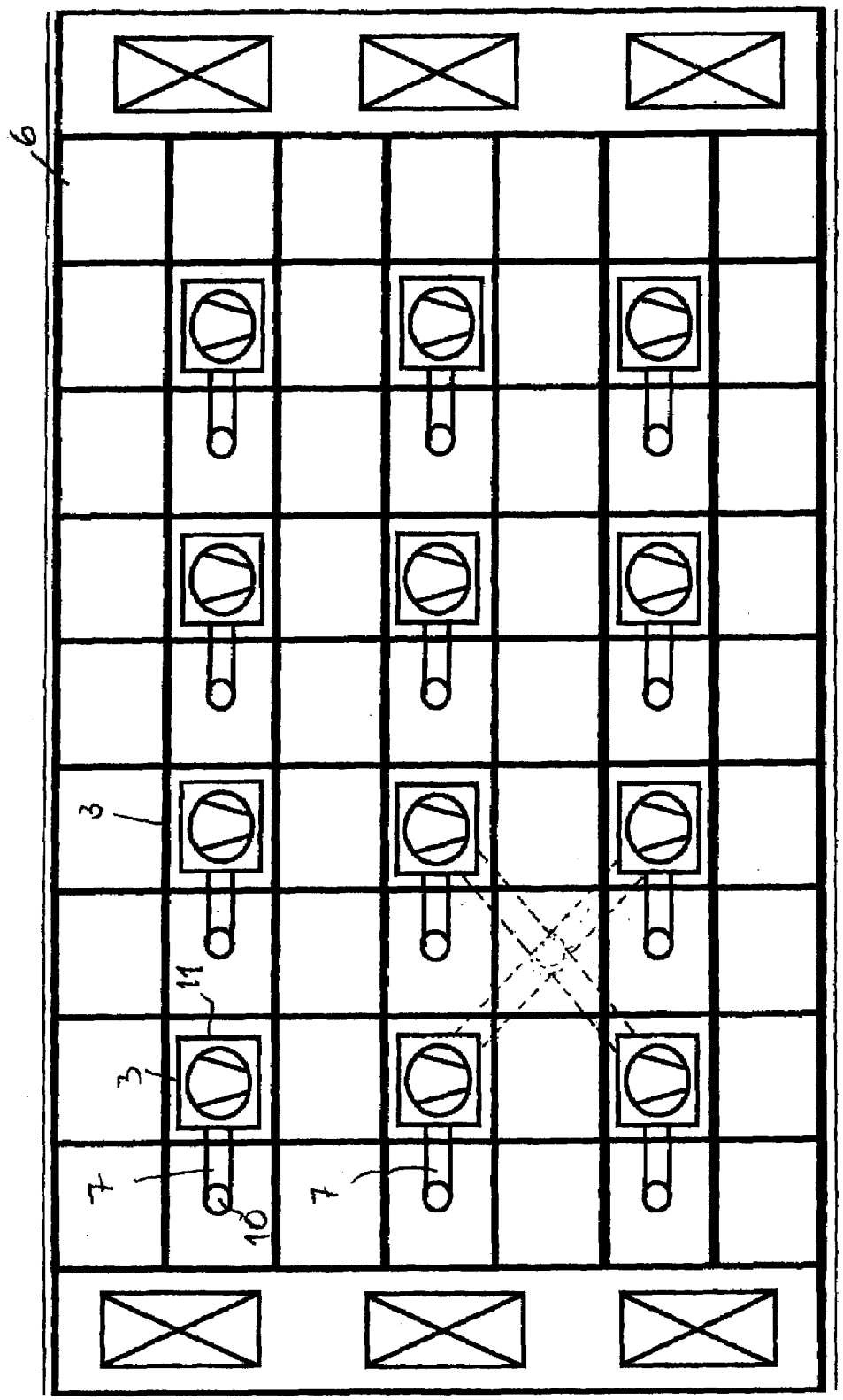
FIG. 11 shows in a plan view a second ceiling layout of a device according to the present invention.
Figure 12:
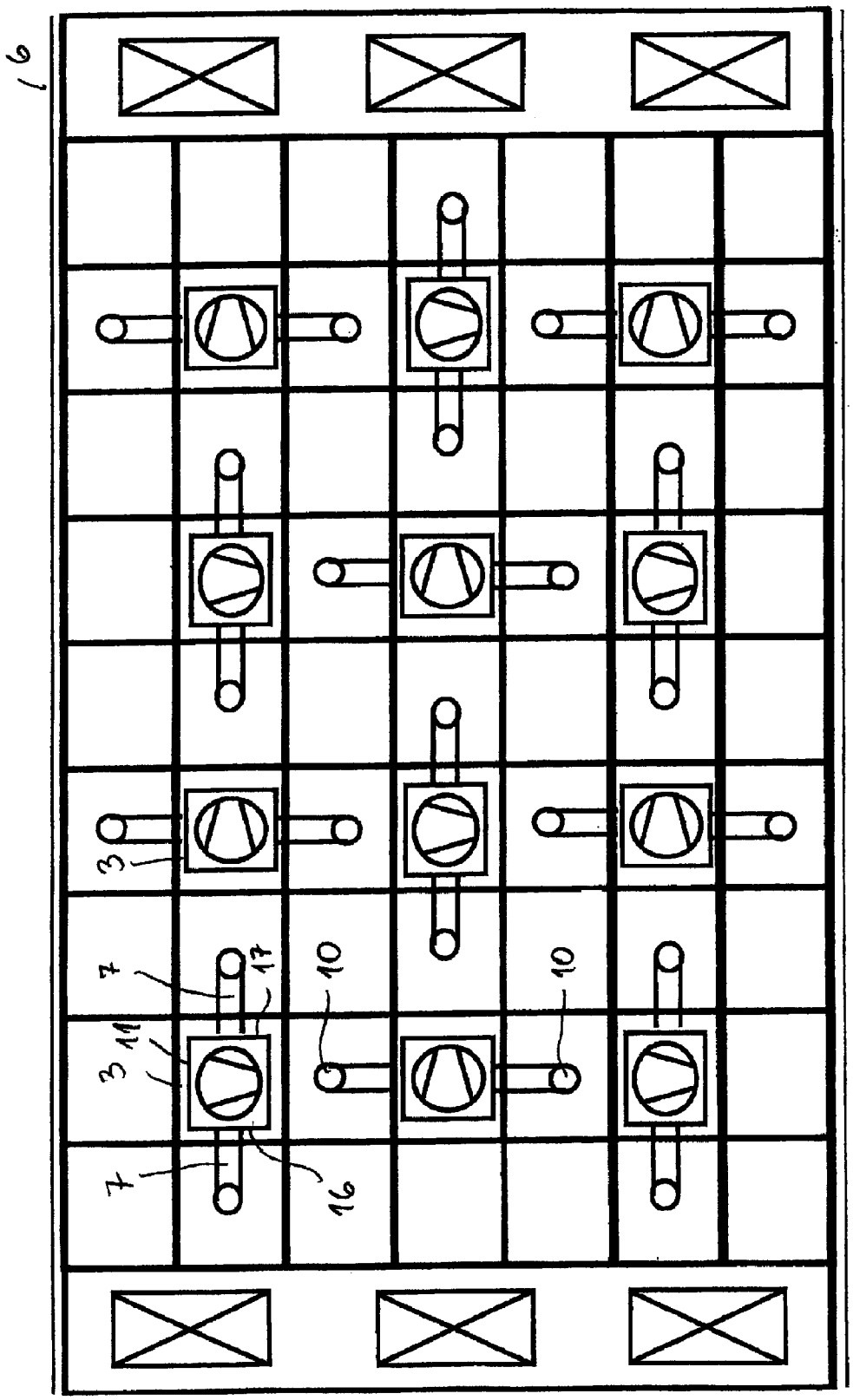
FIG. 12 shows in a plan view a third ceiling layout of a device according to the present invention.

The filter-fan-units 3 are mounted as is conventional in the art on the ceiling 6, advantageously according to the grid dimensions (FIGS. 10 through 12).

Figure 2:
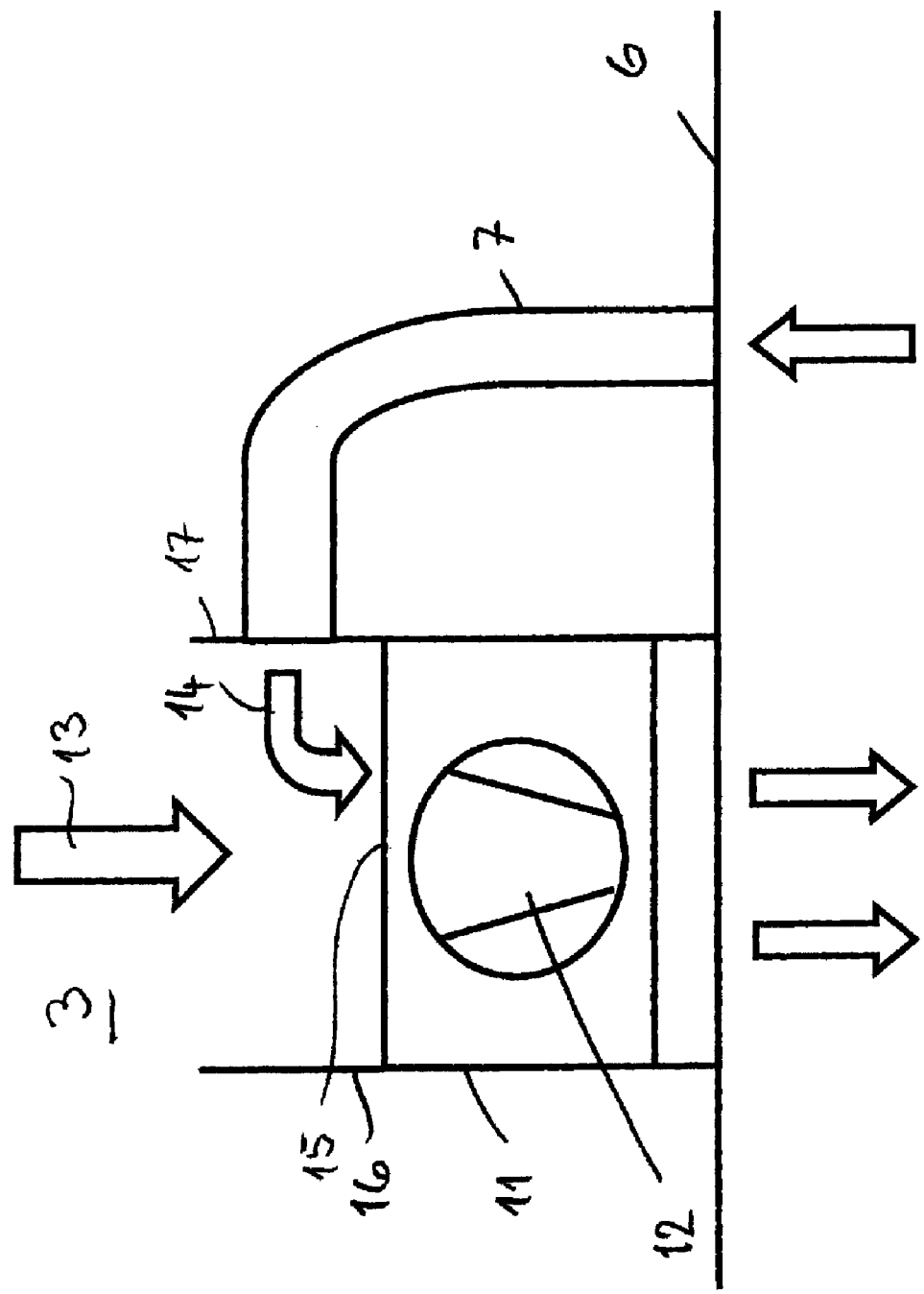
FIG. 2 shows schematically a first embodiment of a filter-fan-unit of the device according to the invention for conditioning recirculating air.

FIG. 2 shows a filter-fan-unit 3 having a housing 11 in which a fan 12 is arranged. It takes in the cooled portion 13 of the recirculating air and the portion 14 of the recirculating air supplied through the intake line 7 and not cooled. In the area above the intake area 15 of the filter-fan-unit 3, the cooled portion 13 and the uncooled portion 14 of the recirculating air are mixed with one another. The recirculating air after passing the filter-fan-unit 3 exits as supply air 18 downwardly into the cleanroom.

The housing 11 of the filter-fan-unit 3 has, for example, a quadrangular contour. The sidewalls 16, 17 of the housing 11 are extended upwardly and surround the intake area 15. The intake line 7 is connected to the sidewall 17. As illustrated in FIG. 2, the intake area 15 is open in the upward direction so that the cooled portion 13 of the recirculating air that has been sucked in through the return air conduits 4, 5 can flow without impairment into the intake area. The intake line 7 can be a hose or a rigid channel. The intake line 7 adjoins perpendicularly the sidewall 17. The portion 14 of the recirculating air that flows out of the intake line 7 is deflected in the intake area 15 by approximately 90 degrees in the downward direction and mixes with the cooled portion 13 of the recirculating air that flows from the top to the bottom.

Figure 3:
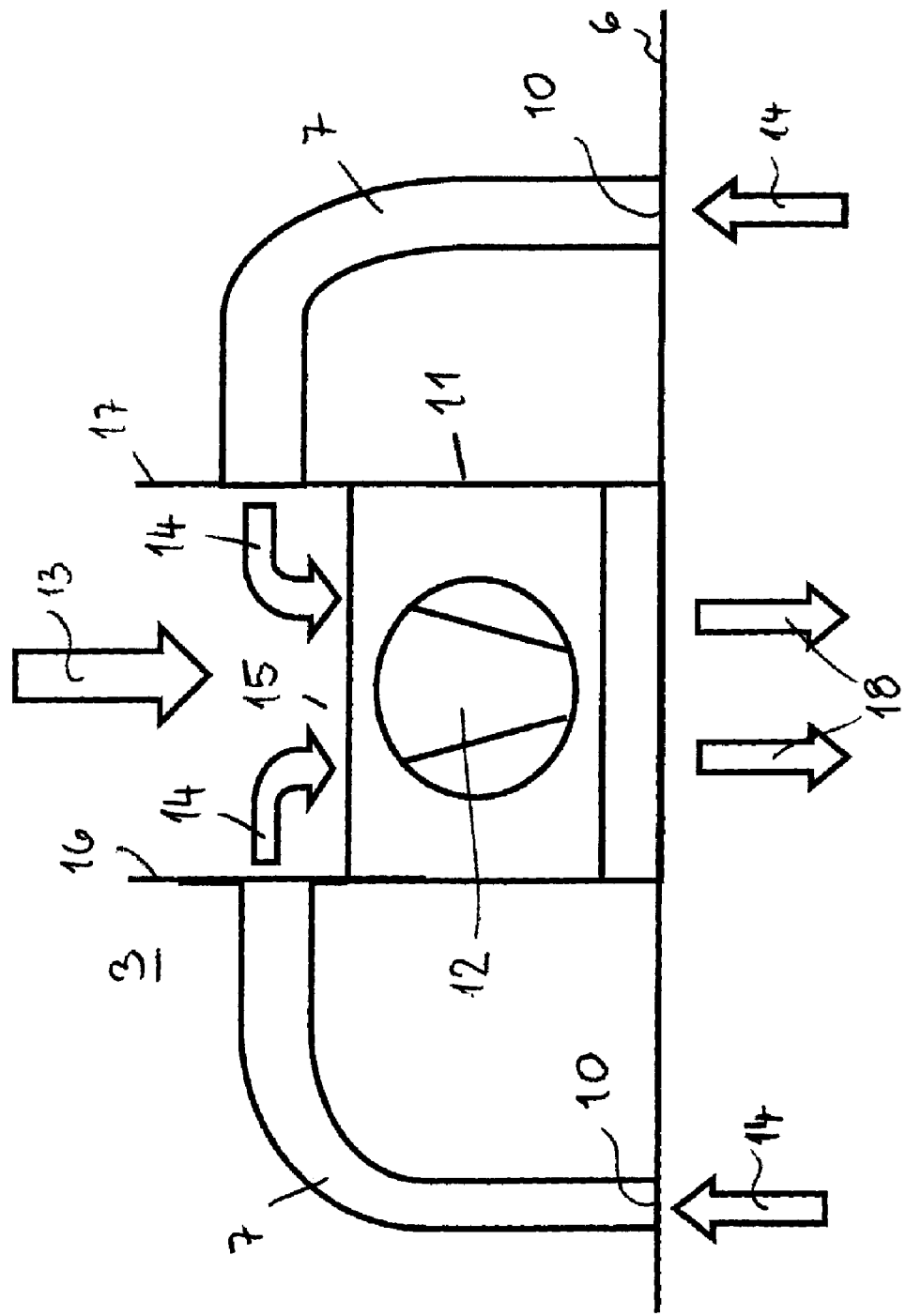
FIG. 3 shows schematically a second embodiment of a filter-fan-unit of the device according to the invention for conditioning recirculating air.

FIG. 3 shows the possibility to connect two intake lines 7 to the filter-fan-units 3. Advantageously, the two intake lines 7 are connected to opposed sidewalls 16, 17 of the housing 11. Both intake lines 7 open into the ceiling 6 so that through the intake openings 10 in the ceiling 6 the recirculating air is sucked in. As in the preceding embodiment, the intake lines 7 are L-shaped and open in the area of the extended sidewalls 16, 17. Since the uncooled portion 14 of the recirculating air flows into the intake area 15 at a spacing above the fan 12, the portion 14 of the recirculating air after exiting from the intake lines 7 is deflected downwardly by approximately 90 degrees. The cooled portion 13 of the recirculating air that flows out of the return air conduits 4, 5 flows from the top to the bottom as in the preceding embodiment and mixes with the uncooled portion 14 of the recirculating air.

The two intake lines 7 have the same flow cross-section. However, it is also possible to provide the two intake lines 7 with different flow cross-sections.

Depending on the requirements, the filter-fan-unit 3 can also have more than two intake lines 7. In the case of a rectangular contour of the housing 11, it is possible, for example, to connect one intake line to each sidewall.

As in the preceding embodiment, the intake openings 10 in the ceiling 6 are positioned so as to be spaced from the correlated filter-fan-unit. In this way, it is ensured that the intake of the return air 14 is not disturbed by the supply air 18 exiting downwardly from the filter-fan-unit and vice versa. The intake lines 7 can also be formed by hoses or by rigid channels or the like.

FIG. 4 shows the possibility of supplying the portion 14 of the recirculating air sucked in via the opening 10 in the ceiling 6 by means of a guiding element in the form of baffle plate 19 to the intake area 15 of the filter-fan-unit 3. A pipe 20 is connected vertically to the intake opening 10; it is spaced from the filter-fan-unit 3 and has a height smaller than that of the housing 11 of the filter-fan-unit 3. The baffle plate 19 is positioned at a minimal spacing above the ceiling 21 of the housing 11. The baffle plate 19 has an edge 22 that is angled at a right angle and adjoins the housing sidewall 16 at the level of the top side 21. The baffle plate 19 projects past the opposed housing sidewall 17 as well as past the pipe 20. The projecting end 23 of the baffle plate 19 is also angled at a right angle in the downward direction and extends across the plane that contains the top side 21 of the housing 11. The baffle plate 19 is positioned at a spacing above the top side 21 and forms together with it a flow channel 24 through which the uncooled portion 14 of the recirculating air as well as the cooled portion 13 of the recirculating air reach the intake area 15. The baffle plate 19 covers the entire surface area of the top side 21 of the housing 11.

The portion 14 of the recirculating air that is sucked in through the opening 10 flows through the pipe 20 vertically upwardly. The portion 14 of the recirculating air hits the area of the baffle plate 19 projecting past the housing 11 and is deflected thereat horizontally in the direction of the flow channel 24. The cooled portion 13 of the recirculating air coming from the return air conduits 4, 5 flows around the angled edge 23 of the baffle plate 19 and is deflected thereat by 180 degrees. The deflected portion 13 of the recirculating air hits also the part of the baffle plate 19 projecting past the filter-fan-unit 3 and is deflected thereat also in the direction toward the flow channel 24. Mixing of the cooled portion 13 and of the uncooled portion 14 of the recirculating air takes place within the mixing area 25 that is located within the area adjacent to the filter-fan-units 3. On its path to the fan 12, the two recirculating airflows are mixed properly with one another before they are sucked into the housing 11. The flow channel 15 cannot only be closed by the angled edge 22 but also at its sides that are positioned in the flow directions so that the flow channel is open only in the direction toward the mixing area 25.

The portion 13 that is coming from the return air conduits 4, 5 can also be supplied, entirely or partially, through at least one opening in the baffle plate 19 in the area above the filter-fan-unit 3 directly to the fan 12.

In the embodiment according to FIG. 5, the pipe 20 has the same height as the housing 11 of the filter-fan-unit 3. A pipe section 26 bent approximately at a 90 degree angle adjoins the pipe 20 and the uncooled portion 14 of the recirculating air exits from it horizontally. The exit opening 27 of the pipe section 26 is located, in a side view according to FIG. 10, at a spacing from the housing 11. The portion 14 of the recirculating air that is taken in through the opening 10 in the ceiling 6 flows from the exit opening 27 in the direction toward the filter-fan-unit 3 whose fan 12 causes the recirculating air to be sucked in. The cooled portion 13 of the recirculating air that has been taken in through the return air conduits 4, 5 flows from the top into the filter-fan-unit 3. The horizontally flowing portion 14 of the recirculating air is deflected downwardly in the direction toward the fan 12 and is thereby mixed with the cooled portion 13 of the recirculating air before entering the filter-fan-unit 3. In this embodiment, the air is blown in a targeted way onto the intake opening that is located in the top side 21 of the housing 11. The intake opening 10 in the ceiling 6, in accordance with the preceding embodiments, has a sufficient spacing from the exit opening of the filter-fan-unit 3. In this way, the suction action of the portion 14 of the recirculating air is not disturbed by the clean air that exits from the exit opening 28 in the downward direction into the cleanroom.

The filter-fan-unit 3 according to FIG. 6 is identical to the embodiment according to FIG. 5. At a spacing adjacent to the housing 11, the pipe 20 projects vertically upwardly from the ceiling 6 and projects past the housing 11. A horizontal conduit section 29 is connected to the pipe section 26 and, in turn, an end member 30 is connected thereto. Like the pipe section 26, it is embodied as a 90 degree angled pipe section from which the uncooled portion 14 of the recirculating air exits downwardly above the intake opening arranged in the top side 21 of the housing 11. The exit opening 31 of the end member 30 is positioned at such a spacing from the top side 21 that the cooled portion 13 of the recirculating air sucked in by the fan 12 mixes sufficiently with the uncooled portion 14 of the recirculating air in the intake area 15. In this embodiment, the uncooled portion 14 of the recirculating air is also blown in a targeted way onto the intake opening provided in the top side 21 of the housing. Since the exit opening 21 is located directly above the intake opening, the uncooled portion 14 of the recirculating air is not deflected along its flow path to the fan 12.

In the embodiment according to FIG. 7, the uncooled portion 14 of the recirculating air is guided within the filter-fan-unit to the fan 12. In the illustrated embodiment, the filter-fan-unit has two intake openings 10 in the ceiling 6 of the cleanroom. A flow channel 32, 33 adjoins the openings 10, respectively, in which the portion 14 of the recirculating air flows upwardly into a horizontal flow channel 34. From here, the cooling air reaches the fan 12. The flow channels 32 to 34 are integrated into the housing 11 of the filter-fan-unit 3 so that outside of the housing auxiliary devices are not required for supplying the portion 14 of the recirculating air to the fan 12. The cooled portion 13 of the recirculating air exiting from the return air conduits 4, 5 is taken in from the top. It mixes before entering the fan 12 with the uncooled portion 14 of the recirculating air flowing within the flow channel 34.

FIGS. 8 and 9 show the possibility of providing on the suction side of the fan 12 the supplied uncooled portion 14 of the recirculating air with a counter swirl relative to the rotational direction 35 of the fan 12. This is achieved in that the two intake lines 7 on the sidewalls 16, 17 of the housing 11 of the filter-fan-unit 3 are not aligned opposite one another on the sidewalls 16, 17 but are displaced relative to one another. In FIGS. 8 and 9, the left intake line 7 is connected near the front wall 36 of the housing 11 and the right intake line 7 is connected near the back wall 37 of the housing 11 to the sidewalls 16 and 17, respectively. In this way, the portion 14 of the recirculating air exits from the intake lines 7 near the front wall 36 as well as near the back wall 37 into the suction area 15 that is enclosed by the extended housing walls 16, 17, 36, 37. The inflow direction of the portion 14 of the recirculating air into the intake area 15 is oriented counter to the rotational direction 35 of the fan 12. Because of this counter swirl, the operating range of the filter-fan-unit 3 is broadened. The counter swirl can be adjusted in a targeted way. As in the embodiment according to FIG. 3, the intake lines 7 open at a spacing from the top side 21 of the housing 11 into the intake area 15. In other regards, the embodiment according to FIGS. 8 and 9 is identical to the embodiment according to FIG. 3.

FIG. 10 shows an example of a ceiling layout employing the described filter-fan-units 3. The ceiling 6 of the cleanroom is designed as is known in the art based on grid dimensions. The return air conduits 4, 5 extend over the entire width of the cleanroom 1. In the two return air conduits 4, 5 three recirculating air cooling devices 8, 9 are arranged at a spacing adjacent to one another. The return air conduits 4, 5 are narrow and extend across the width of the cleanroom. On the ceiling 6, the filter-fan-units 3 are mounted and arranged in series behind and adjacent to one another. All filter-fan-units 3 are identical and each have an intake line 7 that is connected to the corner area of the housing 11 of the filter-fan-units. The intake lines 7 open in the described way into the ceiling 6 so that through the openings 10 in the ceiling 6 a portion of the recirculating air can be sucked in. Since the intake lines 7 are arranged diagonally relative to the filter-fan-units 3, the intake openings 10 are positioned in the grid parts of the ceiling 6 that are diagonally adjacent to the filter-fan-units 3, respectively.

In the ceiling layout according to FIG. 11, the intake lines 7 of the filter-fan-units 3 are connected to the housing 11 perpendicularly. The filter-fan-units 3 have thus a configuration according to FIG. 2. The intake openings 10 in the ceiling 6 thus are located in the grid elements of the ceiling 6 immediately in front of the filter-fan-units 3. The filter-fan-units 3 are arranged also in series adjacent and behind one another and are correspondingly distributed uniformly across the ceiling 6 in accordance with FIG. 10. All filter-fan-units 3 are oriented in the same way in accordance with the preceding embodiment.

FIG. 12 shows the possibility of connecting the intake lines 7 differently to the filter-fan-units 3. In this embodiment, the filter-fan-units 3 are provided with two return air connectors in accordance with the embodiment according to FIG. 3. The two intake lines 7 of each filter-fan-unit 3 are aligned with one another and are connected to the opposed sidewalls 16, 17 of the housing 11. The neighboring filter-fan-units 3 have intake lines 7 that are displaced by 90 degrees relative to one another. The intake openings 10 in the ceiling 6 are positioned in the grid elements of the ceiling 6 adjacent to the filter-fan-units 3, respectively. Since the filter-fan-units 3 are separated by a grid element from one another, respectively, the intake lines 7 of neighboring filter-fan units are arranged so as to be displaced by 90 degrees relative to one another. When between neighboring filter-fan-units 3 two grid elements are provided, the intake lines 7 of neighboring filter-fan-units can however be oriented in the same direction.

The embodiments illustrated by means of FIGS. 10 to 12 are not all encompassing. The filter-fan-units, depending on the requirements and mounting conditions, can be mounted in any suitable way on the ceiling 6. It is even possible to provide on the ceiling 6 different embodiments of filter-fan-units 3.

In the described embodiment, the cleanroom 1 is designed such that approximately 50 percent of the recirculating air is supplied through the return air conduits 4, 5 and approximately 50 percent through the openings 10 in the ceiling 6 to the filter-fan-units 3. This division ratio can however be different. For example, the proportion of recirculating air that is returned through the return air conduits 4, 5 can be 70 percent while the remaining 30 percent of recirculating air are sucked in through the intake openings 10 in the ceiling 6. The greater the proportion of recirculating air taken in through the openings 10, the more the recirculating air cooling devices 8, 9 in the return air conduits 4, 5 must cool the recirculating air passing through them.

The described design of the conditioning device leads to a constructively very simple and particularly inexpensive configuration. The supply air 18 that is conveyed into the cleanroom 1 has the same temperature at all of the filter-fan-units 3. Since the pressure conditions in the cleanroom 1 as well as in the return air conduits 4, 5 as well as in the area of the filter-fan-units 3 above the ceiling 6 are identical, the air proportion exiting from the filter-fan-units 3 is also identical at all times.

In all described embodiments, in the intake line 7 or in the pipe 20 at least one throttle device 38 can be provided, preferably a flap (FIG. 1). With it, the flow cross-section and thus the volume flow can be changed manually or by a control. In this way, possibly occurring local temperature differentials in the cleanroom 1 can be compensated. For example, when the recirculating air portion 14 at one opening 10 is very hot in comparison to the recirculating air portion at the neighboring opening, by means of the throttle device 38 the volume flow of the recirculating air portion 14 flowing through this opening 10 is reduced such that the supply air 18 flowing from the corresponding filter-fan-unit 3 into the clean room 1 has the same temperature as the supply air exiting from the neighboring filter-fan-units.

The temperature compensation can also be achieved by changing the rotational speed of the fan 12. In the described situation of the locally very hot recirculating air portion 14 the rotational speed is increased so that a greater portion of cooled portion 13 of the recirculating air is sucked in.

In the described ceiling layout according to FIGS. 10 through 12, each filter-fan-unit 3 is connected by means of one or two intake lines 7 with one or two openings 10. According to a further embodiment illustrated by dashed lines in FIG. 11, at least two filter-fan-units 3, advantageously four filter-fan-units, are correlated with a single opening 10 in the ceiling 6. In this case, the recirculating air portion 14 is taken in through this opening 10, flows into a pipe 20 from which corresponding lines branch off to the at least two filter-fan-units 3. In this way, two or more filter-fan-units 3 are combined to a group that receives the recirculating air portion 14 through a common opening 10. In such a configuration of the ceiling layout, all describes embodiments can be used.

Figure 13:
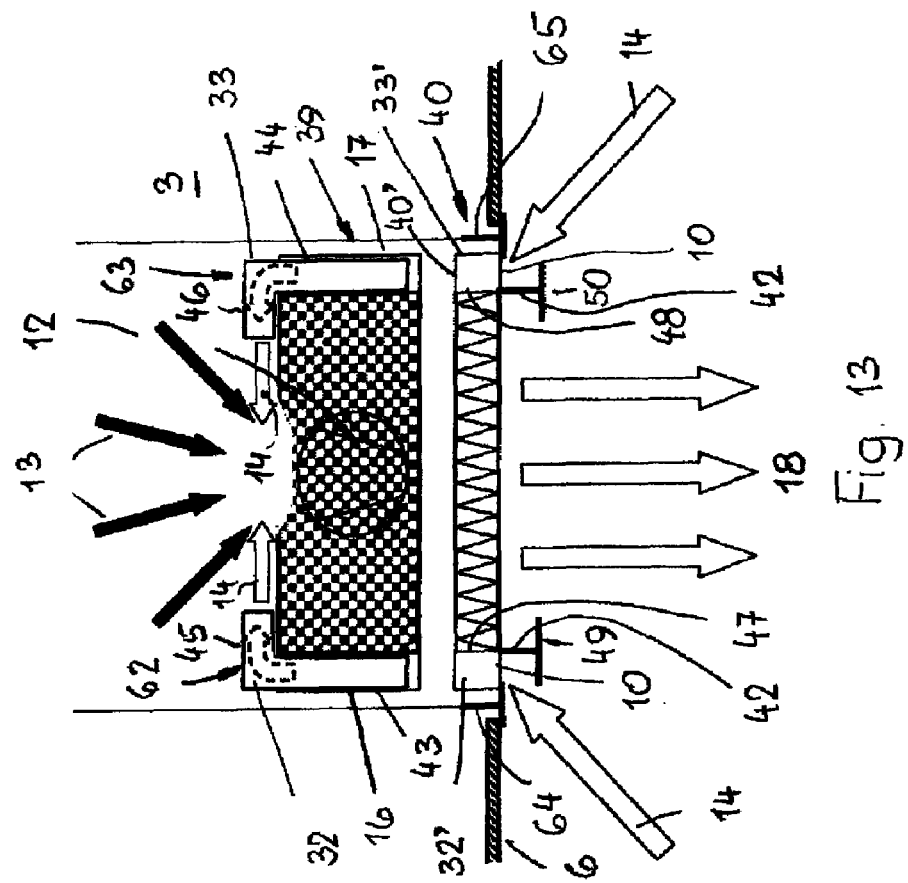
FIG. 13 shows an illustration corresponding to FIGS. 2 through 8 another embodiment of a filter-fan-unit.

The embodiment according to FIG. 13 corresponds essentially to that of FIG. 7. It differs from it essentially in that the fan unit 39 and the filter 40 of the filter-fan-unit 3 are separate units. Accordingly, these units also have separate flow channels 62, 63 and 32', 33' that are aligned with one another when the filter-fan-unit 3 is mounted.

The flow channels 32', 33' of the filter 40 are formed by double-wall sidewalls. The filter frame 40' is positioned on rails 64, 65 forming the ceiling 6. The double-wall sidewalls are positioned parallel to one another and are opened at the top and the bottom and are connected to one another by sidewalls 60, 61 (FIG. 14) that are advantageously formed of profiled sections.

The fan unit 39 comprises a housing 11 whose sidewalls 16, 17 are formed as hollow walls. They are aligned with the sidewalls of the filter 40. The other sidewalls of the housing 11 are configured as in the preceding embodiments.

In the sidewalls 16, 17, L-shaped flow channels 62, 63 are arranged that are positioned to be freely vertically movable. The two flow channels 62, 63 are identical and arranged mirror-symmetrical to one another. The longer leg 43, 44 of the flow channels 62, 63 is positioned in the sidewalls 16, 17 that are positioned opposite one another and parallel to one another and extends across their length and width. The shorter leg 45, 46 is positioned outside of the sidewalls 16, 17. The two short legs 45, 46 are facing one another and are positioned above the housing 1. As illustrated in FIG. 13, the short legs 45, 46, when viewed in plan view, end at a spacing from the fan 12 in the housing 11.

When the fan unit 39 is placed on the filter 40, the double-wall sidewalls of the filter 40 and the double-wall sidewalls 16, 17 of the fan unit 39 each form a continuous double-wall sidewall of the filter-fan-unit 3. These sidewalls form in accordance with the embodiment according to FIG. 7 return flow channels for the uncooled portion 14 of the recirculating air. It flows through the openings 10 located in the ceiling 6 into the return flow channels and exits above the fan 12 horizontally from the legs 45, 46. The cooled portion 13 of the recirculating air exiting from the return air channels 4, 5 is sucked in from above and is mixed before entering the fan 12 with the uncooled portion 14 of the recirculating air.

In order for the supply air 18 that flows out of the filter-fan-unit 3 downwardly into the cleanroom not to be sucked in immediately through the openings 10, it is separated from the sucked-in uncooled recirculating air by shields 49, 50. They are formed preferably by T-shaped rails of metal, plastic material or the like. They are attached with their foot 42 to the filter frame 40' so as to be aligned with the inner walls 47, 48 of the flow channels 32', 33'. The stay of the shields 49, 50 is positioned horizontally at a spacing below the filter 40.

Instead of the flow channels 62, 63 extending across the length of the sidewalls of the filter frame 40', it is also possible to arrange shorter or individual flow pipes in the sidewalls 16, 17 so as to be movable. In this case, the sidewalls 16, 17 are closed in the area outside of the flow pipes so that the entire uncooled return air portion 14 reaches the flow pipes.

In the embodiment according to FIG. 15, the filter-fan-unit 3 has a prefilter 51 that is mounted in a housing attachment 52. The housing attachment adjoins in the upward direction the housing top side 21 and has a smaller base surface than the housing 11. In this way, the sidewalls 53, 54 of the housing attachment 52 are recessed relative to the inner walls 55, 56 of the housing walls 16, 17. Since the flow channels 62, 63 are height adjustably arranged in the sidewalls 16, 17, they can be pulled out to such an extent that the short legs 45, 46 rest on the housing attachment 52. The longer legs 43, 44 than have a spacing from the filter 40 that is greater by the height of the attachment 52.

In this embodiment, lateral shields 49, 50 are present adjacent to the intake openings 10 of the filter 40. The uncooled return air portion 14 flows horizontally from the flow channels 62, 63 above the housing attachment 52 and mixes with cooled return air 13 before reaching the fan 12.

Figure 14:
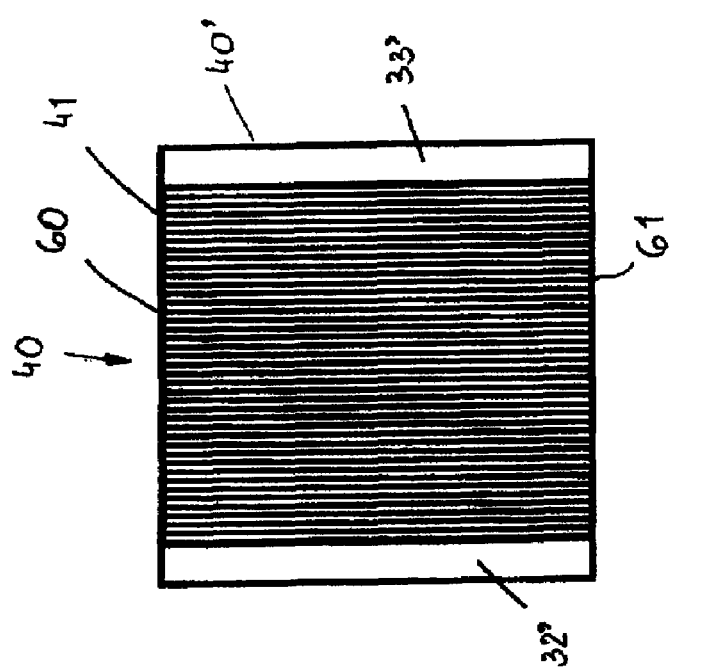
FIG. 14 shows a plan view of the filter of the filter-fan-unit according to FIG. 13.

In other respects, this embodiment is identical to the embodiment according to FIGS. 13 and 14.

The embodiment according to FIG. 16 differs from the preceding embodiment only in that the prefilter 51 in the housing attachment 52 is a chemical filter. Since it is thicker than the prefilter 51 according to FIG. 15, the flow channels 16, 17 are pulled out from the sidewalls 16, 17 of the housing 11 by a corresponding length.

The embodiment according to FIGS. 13 to 16 have the advantage that by means of the flow channels 62, 63 that are arranged movably in the sidewalls 16, 17 an adaptation to fan units or prefilters 51 having different heights is possible without problem.

While specific embodiments of the invention have been shown and described in detail to illustrate the inventive principles, it will be understood that the invention may be embodied otherwise without departing from such principles.

What is claimed is:

1. A device for conditioning recirculating clean room air, the device comprising:

at least one filter fan unit mounted on a ceiling of a room and arranged in a common plenum above the ceiling, wherein the at least one filter fan unit comprises a housing, a fan and a filter, wherein the fan and the filter are arranged inside the housing;

at least one return air conduit through which a first portion of recirculating clean room air is supplied from a bottom area of the room to the common plenum and from the common plenum is sucked in by the fan into the at least one filter fan unit;
wherein the fan has at least one intake that opens into the room at the ceiling;
wherein a second portion of the recirculating clean room air bypasses the at least one return air conduit and is directly supplied to the fan through the at least one intake;
wherein the at least one intake is an intake line connected to the housing of the at least one filter fan unit or the at least one intake is integrated into the housing of the at least one filter fan unit.

2. The device according to claim 1, wherein the fan has an intake area and wherein the at least one intake opens into the intake area of the fan.

3. The device according to claim 1, wherein the intake line is a hose.

4. The device according to claim 1, wherein the intake line is a rigid line.

5. The device according to claim 2, wherein the housing has sidewalls and the sidewalls have an extension, wherein the intake area is delimited at least partially by the extension of the sidewalls of the housing.

6. The device according to claim 5, wherein the intake line opens into the extension of the sidewalls of the housing.

7. The device according to claim 2, wherein the second portion of the recirculating clean room air flows through the at least one return air conduit and is supplied to the intake area.

8. The device according to claim 1, wherein the intake line is approximately L-shaped.

9. The device according to claim 1, wherein the housing has opposed sidewalls and wherein the opposed sidewalls each have at least one of the intake line connected thereto.

10. The device according to claim 9, wherein the intake lines are aligned with one another in an area where the intake lines connect to the opposed sidewalls of the housing.

11. The device according to claim 2, wherein the second portion of the recirculating clean room air in the intake area of the fan is supplied to the fan with a counter swirl relative to a rotational direction of the fan.

12. The device according to claim 11, wherein the second portion of the recirculating clean room air flows at a lateral spacing to an axis of rotation of the fan into the intake area.

13. The device according to claim 11, wherein the housing has at least two opposed sidewalls and wherein the at least two opposed sidewalls each have at least one of the at least one intake line connected thereto and wherein the intake lines on the at least two opposed sidewalls are displaced relative to one another.

14. The device according to claim 1, wherein the first and second portions of the recirculating clean room air are mixed in an intake area of the fan.

15. The device according to claim 1, further comprising at least one guiding element, wherein the second portion of the recirculating clean room air is supplied by the at least one guiding element to the fan.

16. The device according to claim 15, wherein the at least one guiding element extends across the housing of the at least one filter fan unit at a spacing to the housing.

17. The device according to claim 15, wherein the at least one guiding element and the housing of the at least one filter fan unit together delimit a flow channel for the recirculating clean room air.

18. The device according to claim 17, wherein a mixing zone is arranged upstream of the flow channel and wherein the first and second portions of the recirculating clean room air flow into the mixing zone before entering the flow channel.

19. The device according to claim 18, further comprising at least one pipe through which the second portion of the recirculating clean room air is supplied to the mixing zone.

20. The device according to claim 1, further comprising at least one pipe through which the second portion of the recirculating air is supplied to the at least one fan.

21. The device according to claim 20, wherein the at least one pipe is arranged at a spacing from the housing of the at least one filter fan unit.

22. The device according to claim 20, wherein the at least one pipe has an exit opening positioned at a spacing adjacent to the housing of the at least one filter fan unit.

23. The device according to claim 21, wherein the exit opening of the at least one pipe is directed toward the fan.

24. The device according to claim 23, wherein the exit opening of the at least one pipe and the fan have a common axis.

25. The device according to claim 1, wherein the at least one intake comprises at least one flow channel integrated at least partially into the housing of the at least one filter fan unit.

26. The device according to claim 1, wherein the second portion of the recirculating clean room air flows uncooled to the fan.

27. The device according to claim 1, wherein the at least one return air conduit has at least one cooling device for the recirculating clean room air.

28. The device according to claim 1, wherein the at least one filter fan unit has at least a two-part configuration comprising the fan and the filter.

29. The device according to claim 28, wherein the at least one intake comprises flow channels integrated at least partially into the housing of the at least one filter fan unit wherein the flow channels are arranged in two opposed double-wall sidewalls of the housing.

30. The device according to claim 29, wherein the flow channels are arranged height-adjustably in the sidewalls of the housing.

31. The device according to claim 29, wherein the flow channels are L-shaped.

32. The device according to claim 31, wherein the flow channels each have a long leg and a short leg, wherein the long leg projects into the sidewalls of the housing.

33. The device according to claim 32, wherein the short leg of the flow channels rests on the housing or a housing attachment for a prefilter of the at least one filter fan unit.

34. The device according to claim 33, wherein the housing attachment has a smaller base surface than the housing.

35. The device according to claim 32, wherein the long leg of the flow channels extends essentially across at least one of an entire length and an entire width of the sidewalls of the housing.

36. The device according to claim 35, wherein the sidewalls of the at least one filter fan unit are aligned with flow channels of the filter.

37. The device according to claim 36, wherein the flow channels of the filter are formed by double-wall sidewalls.

38. The device according to claim 36, wherein the flow channels of the filter are positioned congruently to the sidewalls of the at least one filter fan unit when the filter is mounted on the fan.

39. The device according to claim 36, wherein the flow channels of the filter have intake openings for the second portion of the recirculating clean room air, wherein the intake openings are arranged within a ceiling of the removal area.

40. The device according to claim 39, wherein on the filter at least one shield is provided.

41. The device according to claim 40, wherein two of the at least one shield are provided and wherein the two shields are spaced from one another.

42. The device according to claim 40, wherein the at least one shield has a substantially T-shaped cross-section.

43. The device according to claim 42, wherein the at least one shield is a rail extending substantially across the entire length of the flow channels.

44. A filter-fan unit comprising:

a housing;

a fan arranged in the housing, wherein the fan has an intake area that takes in a first portion of return air from a plenum of a clean room, in which plenum the filter fan unit is arranged;

a filter arranged in the housing;

at least one intake for recirculating a second portion of return air, wherein the at least one intake is connected to a ceiling of the clean room, wherein the least one intake is integrated into the housing.

* * * * *